June 8, 1965
D. DANIELS
3,187,615
WORKPIECE ALIGNMENT STRUCTURE
Filed April 5, 1963
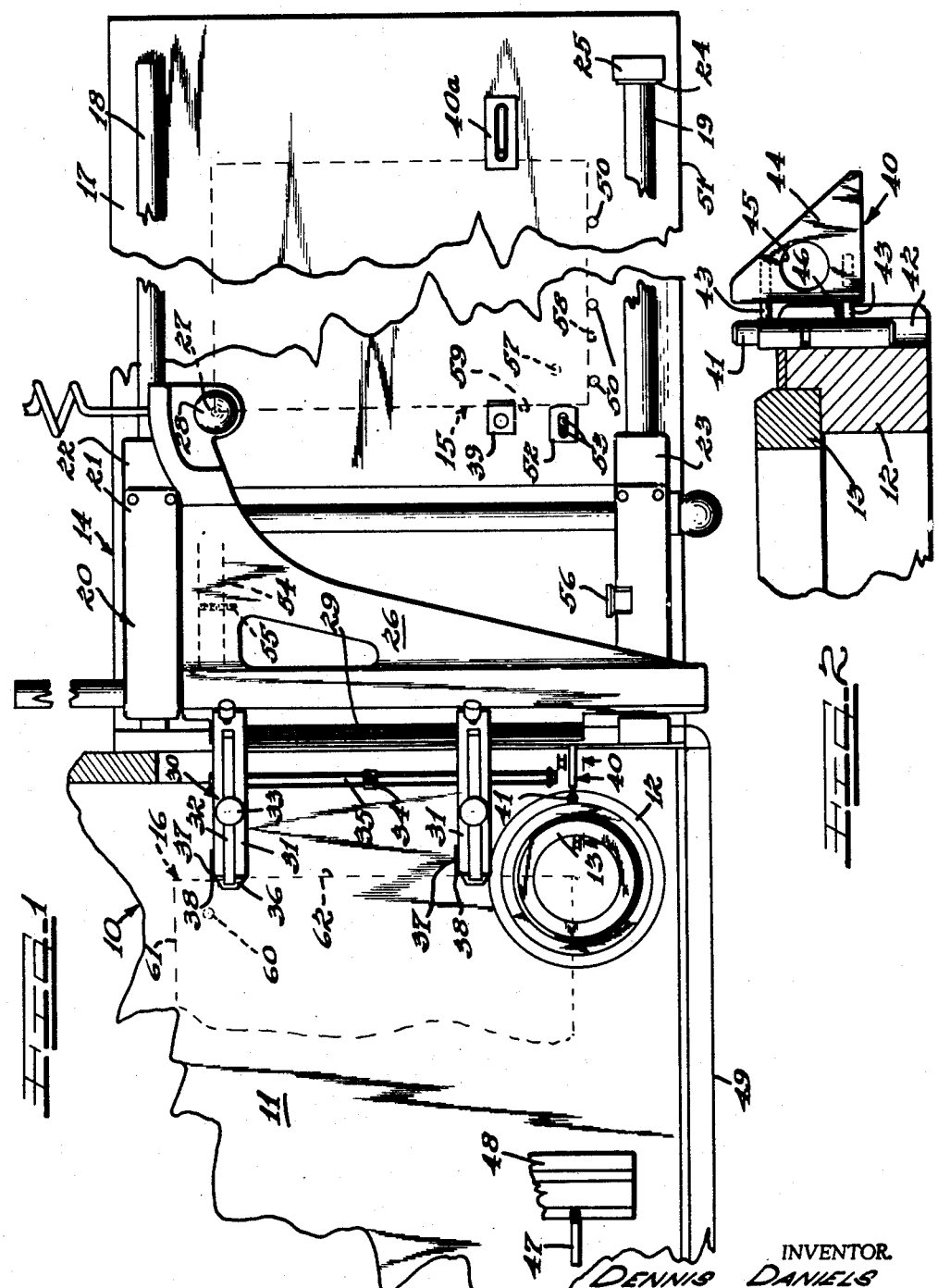
INVENTOR.
DENNIS DANIELS
BY
ATTORNEYS

United States Patent Office 3,187,615
Patented June 8, 1965

3,187,615
WORKPIECE ALIGNMENT STRUCTURE
Dennis Daniels, Williamsville, N.Y., assignor to Houdaille Industries, Inc., Buffalo, N.Y., a corporation of Michigan
Filed Apr. 5, 1963, Ser. No. 270,998
10 Claims. (Cl. 83—413)

This invention relates generally to machine tools, and more specifically to a workpiece alignment structure for a template-type of workpiece-holding duplicator functionally forming a part of such machine tool.

Although the principles of the present invention may be included in various machine tools, a particularly useful application is made in a punching machine. Punching machines employing duplicators have been proposed heretofore. In prior devices, the structure for aligning a workpiece with respect to a template has been unduly complex, difficult to operate, unreliable, or the like.

The present invention contemplates the provision of workpiece alignment structure for such a duplicator or machine tool, which alignment structure is simple to provide, easy to initially adjust, and which is so disposed as to be readily and conveniently examined by the operator. Further, the workpiece alignment structure of the present invention employs no graduated or calibrated gauging, and no such structure needs to be provided as a part of the machine tool in order to utilize the novel alignment structure of the present invention.

Accordingly, it is an object of the present invention to provide an improved workpiece alignment structure for a machine tool.

Another object of the present invention is to provide workpiece aligning structure which is physically disposed adjacent to the forward edge of the machine tool so that the same may be readily viewed when needed.

A still further object of the present invention is to provide workpiece alignment structure which is disposed adjacent to a plane passing through the reciprocatory axis of the tool means.

Many other advantages, features and additional objects of the present invention will become manifest to those versed in the art upon making reference to the detailed description and accompanying sheet of drawings in which a preferred structural embodiment incorporating the principles of the present invention is shown by way of illustrative example.

On the drawings:

FIGURE 1 is a fragmentary plan view of a machine tool having a duplicator, with which there is provided workpiece alignment structure in accordance with the principles of the present invention, the figure being partially broken away; and FIGURE 2 is an enlarged fragmentary cross-sectional view taken along line II—II of FIGURE 1.

As shown on the drawings:

The principles of this invention are particularly useful when embodied in a machine tool, punching machine, or punch press such as is fragmentarily illustrated in FIGURE 1, generally indicated by the numeral 10. The punching machine 10 includes a table 11 supporting a die base or pedestal 12 within which there is supported a die 13. The center of the die 13 is referred to herein as the vertical axis of the tool means of the machine 10. Suitably driven and controlled punch means (not shown) are vertically reciprocated into and out of cooperating relation with the die 13. The machine tool 10 further includes a separate duplicator section 14 of the type which employs a template 15 and which holds a workpiece 16. The duplicator comprises an accessory or optional feature and therefore preferably comprises a separate section which is removably secured to the main part of the punching machine, such securement being by means not shown herein.

The duplicator 14 includes a table 17 to which is secured a rear table bar 18 and a front table bar 19. On the table bars 18, 19 there is slidably disposed a carriage assembly generally indicated at 20. The carriage assembly 20 includes a carriage 21 having bearing blocks 22, 23 slidably supported on the rear and front table bars 18, 19. Movement of the carriage assembly 20 to the left and the right is limited by a bumper ring 24 retained by a bumper retainer 25 on the front table bar 19, there being similar structure at each end thereof.

The carriage assembly 20 further includes a holder 26 which is slidably supported on the carriage 21 for movement in a direction normal to that in which the table bars 18, 19 extend. The holder 26 supports a stylus 27 having a stylus knob 28, and also includes a gib 29 on which there is supported a work holder assembly generally indicated at 30. The work holder assembly 30 includes a pair of clamps 31, 31 each having a rocker finger 32 under the control of a thumb screw 33, the clamps 31 being individually secured and clamped to the gib 29 at any selected position therealong. The clamps 31 are under the joint operative control of a work holder clamp handle 34 secured to an actuating member 35 active on each of the clamps 31. Each of the clamps 31 has a toe plate 36, the upper surface of which is substantially coplanar with the upper surface of the die 13, and on which the workpiece 16 rests. The rocker fingers 32 engage the upper surface of the workpiece 16, and are adjusted by the screws 33, but normally operated by the handle 34.

Each of the clamps 31 further includes a stop 37, the left edge of which comprises a stop surface 38, the stop surfaces 38 defining a line or plane perpendicular to the parallel table bars 18, 19. The gib 29 is likewise perpendicular to the table bars 18, 19, as is also the means by which the holder 26 is slidably supported on the carriage 21.

The template 15 is supported on and secured to the duplicator table 17 by a clamp 39 and by a further clamp 40a, the latter being fastenable to the table 17 in several positions to accommodate various sizes of template 15. The template 15 is provided with a number of holes (not shown) into which the stylus 27 may be guided. Such movement of the stylus 27 positions the workpiece 16 correspondingly since they are co-movable to various positions with respect to the vertical axis of the tool means 13. By such a structure, any hole pattern in the template 15 may be employed with suitable sized and shaped tooling to produce a corresponding number of punching operations on the workpiece 16, which operations are correspondingly located.

However, as a practical matter, the hole pattern in the template 15 is oriented with respect to the edges of the template, and likewise the resultant pattern in the workpiece 16 must be disposed or located a proper distance from the edges of the workpiece. Where the duplicator 14 is separable from the main part of the machine tool 10, it is impractical to build into the machine tool any means by which these components are automatically properly aligned with each other merely as a result of assembly.

Accordingly, in accordance with the present invention, there is provided means for insuring that the workpiece 16 is properly located with respect to the template 15.

To this end, there is provided a workpiece positioner 40, best seen in FIGURE 2. The workpiece positioner 40 includes an upper end 41 which is the gauging or engaging portion. Means generally indicated at 42 slidably guide the workpiece locator or positioner 40, the same comprising a keyhole slot in the die base 12. A pair of pins 43, 43 are press-fitted into the workpiece positioner 40 and extend through the narrow portion of the slot into a triangular block 44 having a finger hole 45. By means of the triangular block 44, the workpiece locator or positioner 40 may be manually extended and retracted, FIGURE 2 being shown in the extended position. The extended position is limited by a pin 46 extending between the pins 43, the pin 46 similarly, if desired, defining the lower retracted position of the positioner 40. The upper end 41 extends above the upper surface of the die 13 so that it extends into the plane in which the workpiece 16 normally lies for engagement therewith. It is desirable to provide a plurality of such positioners 40, and to that end a further positioner 47 of identical structure is provided and is supported by a rail 48. The forwardly directed edges of the workpiece positioners 40, 47 define a plane which is adjacent to the vertical axis of the tool means, and which extends in parallel relation to the table bars 18, 19. It is to be noted that this plane is near the forward edge 49 of the machine tool 10 so that the operator may readily raise and lower the positioners 40, 47 and inspect engagement of the workpiece 16 therewith, under the conditions described below.

Corresponding to the workpiece positioners 40, 47, the duplicator 14 is provided with a plurality of template locators or dowels 50, each of which is rigidly and fixedly secured to the duplicator table 17. The template locators 50 have edges or tangents which lie in a plane parallel to the direction in which the table bars 18, 19 extend. The template locators 50 are disposed near the forward edge 51 of the duplicator table 17, adjacent to the operator of the machine. Collectively they comprise gauge points against which the template 15 may engage.

Corresponding to the stop surfaces 38 on the work holder assembly 30, there is provided adjustable means in the form of an adjustable template locator 52 secured by a pair of lock screws 53 to the duplicator table 17. The adjustable means 52 provides X-axis synchronization or alignment between the workpiece 16 and the template 15, as described below. To provide Y-axis synchronization or adjustment between the workpiece 16 and the template 15 there is further provided adjustable screw means coactive between the holder 26 and the carriage 21. To this end, the holder 26 is provided with a web 54 which extends downwardly and through which an adjustment screw 55 projects horizontally. In alignment with the screw 55, the carriage is provided with an anvil 56 against which the screw 55 may abut and thereby limit movement of the holder 26 toward the operator.

At the initial installation of the machine, steps are taken to insure that the duplicator section 14 is properly and securely attached to the remainder of the machine. This includes insuring that the table bars 18, 19 extend in a direction which is parallel to the plane defined by the workpiece positioners 40, 47, or any other equivalent reference surface. It is then necessary to position the adjustable means 52, 55 so that the positions of the workpiece 16 and of the template 15 are synchronized. Such initial positioning is accomplished using the same structure of the machine as is ultimately used in subsequent production usage of the machine.

To this end, the carriage assembly 20 is moved until the stop surfaces 38 on the clamps 31 are approximately in line with the vertical axis of the tool means 13. This is the condition illustrated in solid lines in FIGURE 1. With the carriage assembly 20 in that position, the template locator 52 is adjusted until its right tangent is approximately in alignment with the centerline of the stylus 27. Then the locking screws 53 are tightened.

A temporary template, which can be made on the machine 10, is then provided, which is square or rectangular and which has one hole in it, approximately two inches from each of its gauging edges. Such a template is illustrated at 15, the hole referred to being shown at 57. (The hole 57 may be provided in a regular production template, if desired, or any hole so located may be used.) The template 15 is positioned with its gauging edge 58 against the template locators 50, and with its gauging edge 59 against the adjustable template locator 52, and is then clamped in position by the means 39, 40a.

The work positioner 40 is then elevated, and the stylus holder 26 is moved forwardly to engage the screw 55 with the anvil 56. The carriage assembly 20 is then moved laterally until the toe plates 36 are disposed about one inch to the right of the upper end 41 of the work positioner 40, both of the clamps 31 being forward of the work positioner 40. A trial workpiece 16 is then placed upon the top of the die 13 and on the toe plates 36 and is firmly pushed against the stop surfaces 38 and against the upper end 41 of the work positioner 40. While the workpiece is so held, it is locked into position by action of the handle 34.

Then the stylus 27 is aligned with the hole 57 and a hole, preferably of the same size, is punched in the trial workpiece 16. This will produce a hole located approximately at 60 and the distance at the hole 60 is located from the edge 61, and the distance that the hole 60 is located from the edge 62 are compared respectively with the distances that the hole 57 is located from the edges 58 and 59. Any discrepancy in the lateral locations is compensated for by adjusting the adjustable template locator 52, and any discrepancy in the other axis is adjusted for by positioning the screw means 55 appropriately.

The exact location of the workpiece positioner 40 is not critical, but by the adjustment of the screw means 55, an accurate relationship is established. When the screw means 55 is properly adjusted, the distance from the center line of the stylus to the edge 58 of the template 15 will be equal to the distance from the center line or axis of the tooling 13 to the edge 61 of the workpiece 16, the edge 61 having been positioned by the workpiece positioner 40.

During such alignment, the edge 61 of the workpiece 16 is adjacent to the axis of the tool means 13, the edge 58 of the template 15 corresponding thereo. The adjacent edge 62 of the workpiece 16 corresponds to the further gauging edge 59 of the template 15.

To utilize the duplicator thereafter, the appropriate template 15 is clamped with its gauging edges engaging the template locators 50, 52. The stylus and workpiece holder 26 is moved to its forward position in which the screw means 55 engages the anvil 56, and which the stop surfaces 38 slightly to the right of the upper end 41 of the work positioner 40. While the holder 26 is thus disposed, the workpiece is moved into engagement with the support surfaces 38 and the upper end 41 of the work positioner 40 and is then clamped. The work positioner 40 is then manually retracted or lowered and the requisite punching is carried out under the guidance of the template 15.

In certain instances, a relatively elongated workpieces will be employed, extending in a lateral direction. Such a workpiece would require that the clamps 31 be relatively close to each other. To align such a workpiece it is preferable that the edge 61 be disposed against the upper ends 41 of both of the work positioners 40 and 47, and while so engaged, moved to the right into engagement with the stop surface or surfaces 38.

Although various minor modifications may be suggested by those versed in the art, it should be understood that I wish to embody within the scope of the patent warranted hereon all such embodiments as reasonably and properly come within the scope of my contribution to the art.

I claim as my invention:

1. In a machine tool having a template-type of workpiece-holding duplicator base attached thereto in approximate alignment, the improvement comprising, in combination therewith:
  (a) a vertically retractible workpiece positioner carried by the machine tool for being engaged by an edge of the workpiece;
  (b) a carriage movable on said duplicator base in a direction parallel to said edge;
  (c) a stylus and workpiece holder movable on said carriage in a direction normal to said edge; and
  (d) adjustable screw means coactive between said holder and said carriage to limit the extent of holder movement in said direction normal to said edge for aligning the stylus with a corresponding edge of the template.

2. In a punching machine adapted to reciprocate tool means in a vertical axis, and having a template-type of workpiece-holding duplicator base attached thereto in approximate alignment, the improvement comprising, in combination therewith:
  (a) a workpiece positioner having an upper end for being engaged by an edge of the workpiece;
  (b) means carried by the machine tool adjacent to said axis and slidably guiding said positioner between an extended position where said upper end extends into the plane of the workpiece, and a retracted position where said upper end is beneath the plane of the workpiece;
  (c) means secured to said positioner by which said positioner may be manually extended and retracted;
  (d) a carriage movable on said duplicator base in a direction parallel to said first named edge;
  (e) a stylus and workpiece holder movable on said carriage in a direction normal to said first named edge;
  (f) stop surface means on said holder against which an edge adjacent to said edge of the workpiece is engageable;
  (g) adjustable screw means coactive between said holder and said carriage to limit the extent of holder movement in said direction normal to said first named edge for aligning the stylus with a corresponding edge of the template;
  (h) adjustable means on said duplicator base engageable by a further edge of the template corresponding to said adjacent edge of the workpiece; and
  (i) template locator means fixedly carried by said duplicator base for being engaged by said first named corresponding edge of the template.

3. In a machine tool, the improvement comprising in combination therewith:
  (a) a template-holding-type of duplicator base attached to the machine tool in approximate alignment;
  (b) a vertically retractible workpiece positioner carried by the machine tool for being engaged by an edge of the workpiece;
  (c) a carriage movably supported on said duplicator base;
  (d) a stylus and workpiece holder movable on said carriage in a direction normal to that of the carriage movement; and
  (e) adjustable means on one of said carriage and holder for aligning said holder with a corresponding edge of the template.

4. In a punching machine constructed to reciprocate tool means in a vertical axis, the improvement comprising in combination therewith:
  (a) a template-holding-type of duplicator base attached to the machine tool in approximate alignment;
  (b) a vertically retractible workpiece positioner carried by the punching machine adjacent to said axis for being engaged by an edge of the workpiece lying adjacent to said axis;
  (c) a carriage movably supported on said duplicator base;
  (d) a stylus and workpiece holder movable on said carriage in a direction normal to that of the carriage movement; and
  (e) adjustable means on one of said carriage and holder for aligning said holder with a corresponding edge of the template.

5. In a machine tool, the improvement comprising in combination therewith:
  (a) a template-holding-type of duplicator base attached to the machine tool in approximate alignment;
  (b) a workpiece positioner having an upper end for being engaged by an edge of the workpiece;
  (c) means carried by the machine tool and slidably guiding said positioner between an extended position where said upper end extends into the plane of the workpiece, and a retracted position where said upper end is beneath the plane of the workpiece;
  (d) means secured to said positioner by which said positioner may be manually extended and retracted;
  (e) a carriage movably supported on said duplicator base;
  (f) a stylus and workpiece holder movable on said carriage in a direction normal to that of the carriage movement; and
  (g) adjustable means on one of said carriage and holder for aligning said holder with a corresponding edge of the template.

6. In a machine tool, the improvement comprising in combination therewith:
  (a) a template-holding-type of duplicator base attached to the machine tool in approximate alignment;
  (b) a vertically retractible workpiece positioner carried by the machine tool for being engaged by an edge of the workpiece;
  (c) a carriage movably supported on said duplicator base;
  (d) a stylus and workpiece holder movable on said carriage in a direction normal to that of the carriage movement;
  (e) adjustable means on one of said carriage and holder for aligning said holder with a corresponding edge of the template; and
  (f) template locator means fixedly carried by said duplicator base for being engaged by said corresponding edge of the template.

7. In a machine tool, the improvement comprising in combination therewith:
  (a) a template-holding-type of duplicator base attached to the machine tool in approximate alignment;
  (b) a vertically retractible workpiece positioner carried by the machine tool for being engaged by an edge of the workpiece;
  (c) a carriage movably supported on said duplicator base;
  (d) a stylus and workpiece holder movable on said carriage in a direction normal to that of the carriage movement;
  (e) stop surface means on said holder against which an edge adjacent to said edge of the workpiece is engageable;
  (f) adjustable means on one of said carriage and holder for aligning said holder with an edge of the template corresponding to said first named edge of the workpiece; and
  (g) adjustable means on said duplicator base engageable by a further edge of the template corresponding to said adjacent edge of the workpiece.

8. In a machine tool, the improvement comprising in combination therewith:
  (a) a template-holding-type of duplicator base attached to the machine tool in approximate alignment;
  (b) a carriage movably supported on said duplicator base;
  (c) a stylus and workpiece holder movable on said carriage in a direction normal to that of the carriage movement;

(d) stop surface means on said holder against which an edge of the workpiece is engageable; and
(e) adjustable means on said duplicator base engageable by an edge of the template corresponding to said edge of the workpiece.

9. In a machine tool, the improvement comprising in combination therewith:
   (a) a template-holding-type of duplicator base attached to the machine tool in approximate alignment;
   (b) a plurality of vertically retractible workpiece positioners carried by the machine tool for being engaged by a single edge of the workpiece;
   (c) a carriage movably supported on said duplicator base;
   (d) a stylus and workpiece holder movable on said carriage in a direction normal to that of the carriage movement;
   (e) adjustable means on one of said carriage and holder for aligning said holder with a corresponding edge of the template; and
   (f) a plurality of template locator means fixedly carried by said duplicator base in a line extending parallel to said edge of the workpiece for being engaged by said corresponding edge of the template.

10. In a machine tool, the improvement comprising in combination therewith:
    (a) a template-holding-type of duplicator base attached to the machine tool in approximate alignment;
    (b) a vertically retractible workpiece positioner carried by the machine tool near its forward edge for being engaged by an edge of the workpiece;
    (c) a carriage movably supported on said duplicator base;
    (d) a stylus and workpiece holder movable on said carriage in a direction normal to that of the carriage movement;
    (e) adjustable means on one of said carriage and holder for aligning said holder with a corresponding edge of the template; and
    (f) template locator means fixedly carried by said duplicator base near its forward edge for being engaged by said corresponding edge of the template.

References Cited by the Examiner
UNITED STATES PATENTS
2,701,017   2/55   Wiedemann.

ANDREW R. JUHASZ, *Primary Examiner.*